(12) United States Patent
Workman et al.

(10) Patent No.: US 11,794,047 B2
(45) Date of Patent: Oct. 24, 2023

(54) FLUID CONTROL VALVE ASSEMBLY FOR FIRE PROTECTION SYSTEMS

(71) Applicants: Viking Group, Inc., Caledonia, MI (US); Minimax Viking Research & Development GmbH, Bad Oldesloe (DE)

(72) Inventors: Martin H. Workman, Delton, MI (US); Shawn J. Feenstra, Caledonia, MI (US)

(73) Assignees: Viking Group, Inc., Caledonia, MI (US); Minimax Viking Research & Development GmbH, Bad Oldesloe (DE)

( * ) Notice: Subject to any disclaimer, the term of this patent is extended or adjusted under 35 U.S.C. 154(b) by 0 days.

(21) Appl. No.: 17/782,525

(22) PCT Filed: Jul. 29, 2021

(86) PCT No.: PCT/US2021/043695
§ 371 (c)(1),
(2) Date: Jun. 3, 2022

(87) PCT Pub. No.: WO2022/026703
PCT Pub. Date: Feb. 3, 2022

(65) Prior Publication Data
US 2023/0191176 A1  Jun. 22, 2023

Related U.S. Application Data

(60) Provisional application No. 63/059,669, filed on Jul. 31, 2020.

(51) Int. Cl.
*A62C 35/68* (2006.01)
*A62C 37/46* (2006.01)
(Continued)

(52) U.S. Cl.
CPC ............ *A62C 35/68* (2013.01); *A62C 35/605* (2013.01); *A62C 37/46* (2013.01); *F16K 7/12* (2013.01); *F16K 31/1266* (2013.01)

(58) Field of Classification Search
CPC ....... A62C 35/68; A62C 37/46; A62C 35/605; F16K 31/126; F16K 7/12; F16K 31/1266
See application file for complete search history.

(56) References Cited

U.S. PATENT DOCUMENTS 5,236,049 A  8/1993 Asselin et al.
5,927,406 A  7/1999 Kadoche
(Continued)

FOREIGN PATENT DOCUMENTS

CN  2480642  3/2002
CN  203169886 U  9/2013
(Continued)

OTHER PUBLICATIONS

International Searching Authority, International Search Report and Written Opinion in International Appin. No. PCT/US2021/043695, dated Nov. 4, 2021, 20 pages.

*Primary Examiner* — Tuongminh N Pham
(74) *Attorney, Agent, or Firm* — Perkins Coie LLP (57) ABSTRACT

Fluid control valve assemblies for use in fire protection sprinkler systems to control the flow of firefighting fluid to the system sprinklers. The assemblies include a pressure-operated fluid control valve having an internal fluid chamber in which fluid contained therein acts on an internal diaphragm to control the flow of fluid from an inlet to an outlet of the valve. An environment-responsive control device in fluid communication with the internal fluid chamber along a first fluid communication line controls the flow of fluid out of the fluid chamber to initiate actuation of the valve. A fluid-flow latch in fluid communication with the outlet of the valve along a second fluid communication line subsequently (Continued)

controls the simultaneous flow of fluid out of the fluid chamber and the actuation of the valve.

21 Claims, 3 Drawing Sheets

(51) Int. Cl.
*A62C 35/60* (2006.01)
*F16K 7/12* (2006.01)
*F16K 31/126* (2006.01)

(56) References Cited

U.S. PATENT DOCUMENTS

| | | | |
|---|---|---|---|
| 7,059,578 B2 | 6/2006 | Frenkel | |
| 9,249,896 B2 | 2/2016 | Folk | |
| 9,587,750 B2 | 3/2017 | Ringer et al. | |
| 9,776,028 B2 | 10/2017 | Feenstra et al. | |
| 9,802,071 B2 | 10/2017 | Chen | |
| 10,653,906 B2 | 5/2020 | Ringer et al. | |
| 11,009,137 B2 | 5/2021 | Ringer et al. | |
| 2005/0205815 A1 | 9/2005 | Frenkel | |
| 2017/0225021 A1 | 8/2017 | Williams et al. | |
| 2019/0162318 A1 | 5/2019 | Ringer et al. | |
| 2020/0282248 A1 | 9/2020 | Kempf et al. | |

FOREIGN PATENT DOCUMENTS

| | | |
|---|---|---|
| CN | 207520505 U | 6/2018 |
| JP | 3661930 | 6/2005 |
| KR | 200445432 Y1 | 7/2009 |
| TW | 4979778 | 8/2002 |
| TW | M 451456 U | 4/2013 |
| TW | M 506620 U | 8/2015 |
| WO | WO2016/022497 | 2/2016 |
| WO | WO2016/179406 | 11/2016 |

FLUID CONTROL VALVE ASSEMBLY FOR FIRE PROTECTION SYSTEMS

PRIORITY DATA AND INCORPORATION BY REFERENCE

This application is a 35 U.S.C. § 371 application of International Application No. PCT/US2021/043695, filed Jul. 29, 2021, which claims the benefit of U.S. Provisional Application No. 63/059,669, filed Jul. 31, 2020, each of which is incorporated by reference in its entirety.

TECHNICAL FIELD

The present invention relates generally to fluid control valve assemblies for fire protection sprinkler systems. More specifically, the present invention relates to pressure-operated fluid control valve assemblies and their method of operation for controlling the delivery of firefighting fluid from a fluid supply to a network of fire protection sprinklers.

BACKGROUND ART

Generally, known fire protection systems include a network of fire protection sprinklers that are positioned over an area to be protected. A network of pipes inter-connect the fire protection sprinklers to one another and a source of firefighting fluid such as, for example, a water main line. Located between the sprinklers and the fluid sources is a fluid control valve assembly that controls the flow and pressure of water to the sprinklers. When the system is placed in service, the fluid control assembly is in a normally closed state in which the assembly withholds water from the fire protection sprinklers. In response to a one or more environmental or system conditions, the valve assembly actuates to an open state to permit the flow of water to the sprinklers for distribution over the area of protection. These known fire protection systems can be configured as either a deluge system or a preaction system in which the valve assembly actuates in response to a fire detector and/or a drop in system gas pressure depending on the system's configuration. Thus, fluid discharge from the fire protection sprinklers can occur immediately after valve actuation or otherwise be interlocked with the one or more detection devices.

In some known systems, the valve assembly includes a pressure-operated fluid control valve coupled or associated with an actuator which alters an internal pressure of the valve to cause the valve to operate and change from a closed state to an open state permitting the flow of water from the fluid main to the network of sprinklers. One type of known pressure-operated fluid control valve is a diaphragm style valve. Installed, the valve body of a diaphragm valve includes an inlet that is coupled to the water main and an outlet that is connected to the sprinkler piping. The internal surface of the valve body defines an internal passageway that extends from the inlet to the outlet with a valve seat formed along the passageway between the inlet and the outlet.

An internal elastomeric diaphragm cooperates with the internal surface and the valve seat to control the flow of fluid through the valve from the inlet to the outlet. The elastomeric diaphragm includes a seal surface and an opposite support surface in which the seal surface confronts the internal surface and valve seat of the valve body. In the closed state of the valve, the seal surface forms a sealed engagement with the valve seat which prohibits fluid flow between the inlet and the outlet. In the open state of the valve, the seal surface is displaced from the seat to permit fluid flow between the inlet and the outlet of the passageway.

The valve includes a cover that is mounted to the valve body to enclose the elastomeric diaphragm. The cover confronts the support surface of the elastomeric diaphragm to define a fluid chamber therebetween. Fluid is introduced into and drained from the valve chamber to control movement of the diaphragm between the closed position and the open position. More specifically, the fluid chamber is filled to a fluid pressure sufficient to seat the elastomeric diaphragm in its closed position against the valve seat. To displace the diaphragm in its open position, the fluid pressure is relieved by draining fluid from the chamber to allow the diaphragm to displace to its open position. When the valve is installed and placed in service, the water supplied at the valve inlet applies fluid pressure on the sealing surface of the diaphragm to bias the diaphragm away from the valve seat. When the fluid pressure is reduced in the valve chamber, the fluid at the inlet valve continues to act on the diaphragm to displace it to the open position and flow to the outlet of the valve. With the diaphragm displaced and in the open state, water at the inlet of the valve is discharged out the valve outlet and flows to the piping network to supply the fire protection sprinklers.

The following patent documents show and describe examples of diaphragm valves, their internal structure and their installations: U.S. Patent Application Publication No. 2020/0282248, U.S. Pat. Nos. 11,009,137; 10,653,906; 7,059,578; and 9,587,750; China Patent No. CN 207520505U; China Patent No. 2480642Y; PCT Patent Application No. WO 2016/179406; and PCT Patent Application No. WO 2016/022497. The cover of some known diaphragm valves includes a single port through which fluid is supplied and drained to alter the fluid pressure within the valve chamber. Other diaphragm valves have covers with two ports with one port configured for supplying fluid to the valve chamber and the other port for drainage from the valve chamber as shown, for example, in China Patent No. CN 207520505U. In some known system installations, a priming or fill line is configured and connected for continuously supplying fluid into the chamber to maintain the diaphragm in its closed position and place the system into service. To drain fluid from the valve chamber, a drain line is provided by connecting one or more environment-responsive actuators to either the same port of the diaphragm valve as the priming line or to the dedicated drain valve port. The environment-responsive actuators can be any one of a pneumatic actuator, an electric actuator, a pressure-operated actuator, a hydraulic actuator, or a combination of any of a pneumatic, electric, pressure-operated, or hydraulic actuator that is coupled to an environmental or system detection device. In response to a given environmental or system condition, the responsive actuator is opened to drain fluid from the valve chamber.

For example, depending upon the configuration of some known systems, an environment-responsive actuator can be operated by a detection device such as a thermostat or smoke detector that indicates a fire, and/or a pressure switch that detects a drop in system gas pressure or other detected condition that indicates an actuated sprinkler. Operation of the environment-responsive actuator drains the valve chamber of the diaphragm valve permitting displacement of the internal diaphragm and opening of the valve to supply fluid to the system sprinklers. For valve arrangements in which the valve chamber is filled and drained through a common port, the priming line typically includes a restriction orifice to restrict the incoming fluid flow to a supply rate that is slower than the discharge rate from the environment-responsive actuator to ensure that water is drained from the chamber faster than it is supplied and that the fluid chamber pressure is sufficiently reduced to displace the diaphragm. In other arrangements, such as that shown in U.S. Pat. No. 10,653,906, a multi-port valving component is directly connected to port of the diaphragm valve to indirectly connect multiple environment-responsive actuators to the valve chamber and provide some drainage redundancy.

Accordingly, effective operation of the system and the diaphragm valve is dependent upon the proper drainage of fluid from the valve port to sufficiently alter the pressure of the valve chamber and displace the internal diaphragm. However, some of the known valve installation arrangements can have potential problems or operational disadvantages. For example, in an installation arrangement in which fluid drainage occurs through the same valve port of the valve chamber for fluid fill, flow of fluid out of the valve chamber can be inhibited which can impact the displacement of the internal diaphragm. Moreover, there is a potential problem that the diaphragm does not fully displace to the open position such that the diaphragm valve does not experience full fluid flow if the single valve port, dedicated drain line and/or environment-responsive actuator encounter operational difficulties. Arrangements using the multi-port valve component for direct connection to the valve port can also have its disadvantages because it adds complexity to the system installation. Additionally, if the component has operational difficulties it can inhibit fluid drainage. Accordingly, there remains a need for diaphragm valve configurations and installation arrangements to provide improved valve operation and system response.

DISCLOSURE OF INVENTION

Preferred embodiments of a fluid control valve assembly for use in fire protection sprinkler systems and their method of operation are provided. Preferred embodiments of the assembly include a pressure-operated fluid control valve having an internal elastomeric diaphragm and fluid chamber in which fluid contained within the fluid chamber flows through multiple fluid communication lines to alter the fluid pressure acting on the diaphragm to control the flow of firefighting fluid from an inlet to an outlet of the valve. A preferred environment-responsive control device is in fluid communication with the internal fluid chamber along a first fluid communication line to initiate the flow of fluid out of the fluid chamber and control actuation of the valve. More preferably, the environment-responsive control device includes at least one release valve that operates in response to a fire detector to release fluid from the internal chamber along the first fluid communication line. The preferred fluid control valve assembly also includes a preferred fluid-flow latch in fluid communication with the outlet of the pressure-operated valve along a second fluid communication line to subsequently control the flow of fluid out of the fluid chamber and the actuation of the valve. More preferably, the fluid-flow latch preferably includes another release valve that operates in response to fluid pressure detected at the outlet of the pressure-operated fluid control valve to release fluid from the internal chamber along the second fluid communication line simultaneously with the fluid release along the first fluid communication line.

One preferred embodiment of the fluid control valve assembly includes a pressure-operated fluid control valve having a valve body including a surface defining a passageway with an inlet and an outlet disposed along a longitudinal axis and a seat transverse to the longitudinal axis. An elastomeric diaphragm is disposed adjacent the valve body. The elastomeric diaphragm includes a seal surface and a support surface. The elastomeric diaphragm defines a closed position in which the seal surface contacts the seat to prohibit fluid flow between the inlet and the outlet of the passageway and an open position in which the seal surface displaces from the seat to permit fluid flow between the inlet and the outlet of the passageway. A cover is disposed on the valve body such that the cover provides an inner surface confronting the support surface of the elastomeric diaphragm to define a fluid chamber. The cover further includes at least one primary port in direct fluid communication with the fluid chamber and at least one secondary port in direct fluid communication with the fluid chamber. The fluid control valve assembly further includes an actuator having: (i) an environment-responsive control device in fluid communication with the at least one primary port, the inlet of the passageway, and a first fluid outlet; and (ii) a fluid-flow latch in fluid communication with the at least one secondary port, the outlet of the passageway, and a second fluid outlet.

Preferred methods of operating a pressure-operated fluid control valve of the assembly include (i) establishing, in response to an environmental condition, a primary fluid communication line between the fluid chamber and a first fluid outlet, and (ii) establishing, in response to the fluid flow between the inlet and outlet of the passageway, a secondary fluid communication line between the fluid chamber and a fluid second outlet.

BRIEF DESCRIPTION OF DRAWINGS

The accompanying drawings, which are incorporated herein and constitute part of this specification, illustrate exemplary embodiments of the invention, and together, with the general description given above and the detailed description given below, serve to explain the features of the invention. It should be understood that the preferred embodiments are some examples of the invention as provided by the appended claims.

MODE(S) FOR CARRYING OUT THE INVENTION

Figure 1:
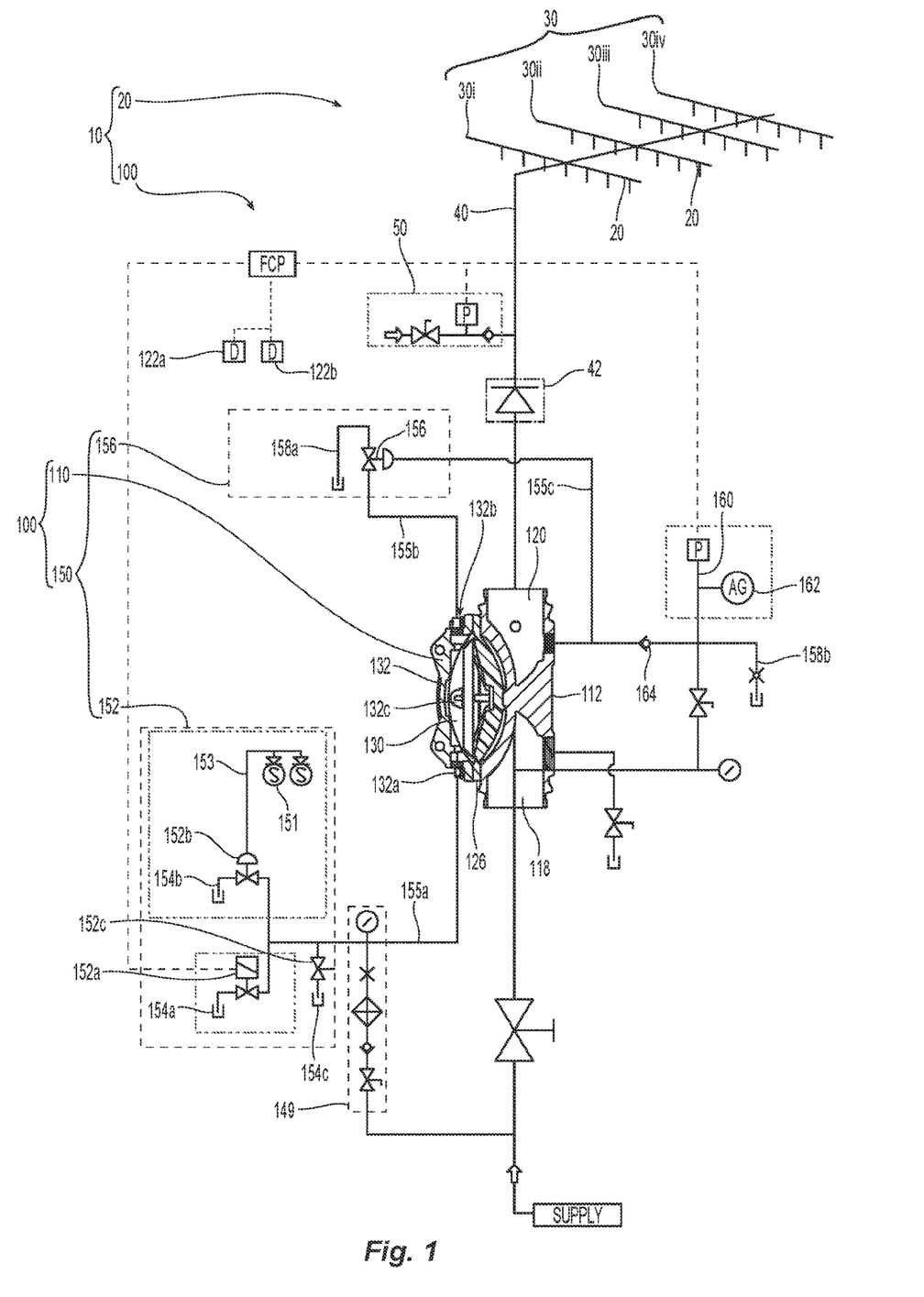
FIG. 1 is a schematic view of various embodiments of a fire protection system having a preferred fluid control valve assembly.

Shown in FIG. 1 is an illustrative embodiment of a fire protection system 10 having a network of fluid distribution devices 20 for distributing a firefighting fluid over an area being protected. Fluid distribution devices, as used herein can be embodied by, any one of the following but not limited to: fire protection sprinklers, nozzles, mist devices, etc. To control the supply of fluid to the fluid distribution devices 20, the system 10 includes a preferred fluid control valve assembly 100 for controlling the flow and pressure of firefighting fluid from a supply source SUPPLY to the fluid distribution devices 20 that are interconnected by a network of pipes 30. The valve assembly 100 has a normally closed state in which the assembly withholds the fluid from the network of fluid distribution devices 20. In response to a set of environmental conditions the valve assembly 100 actuates to an open state to permit fluid flow from the fluid source SUPPLY to the network of fluid distribution devices 20.

Figure 2:
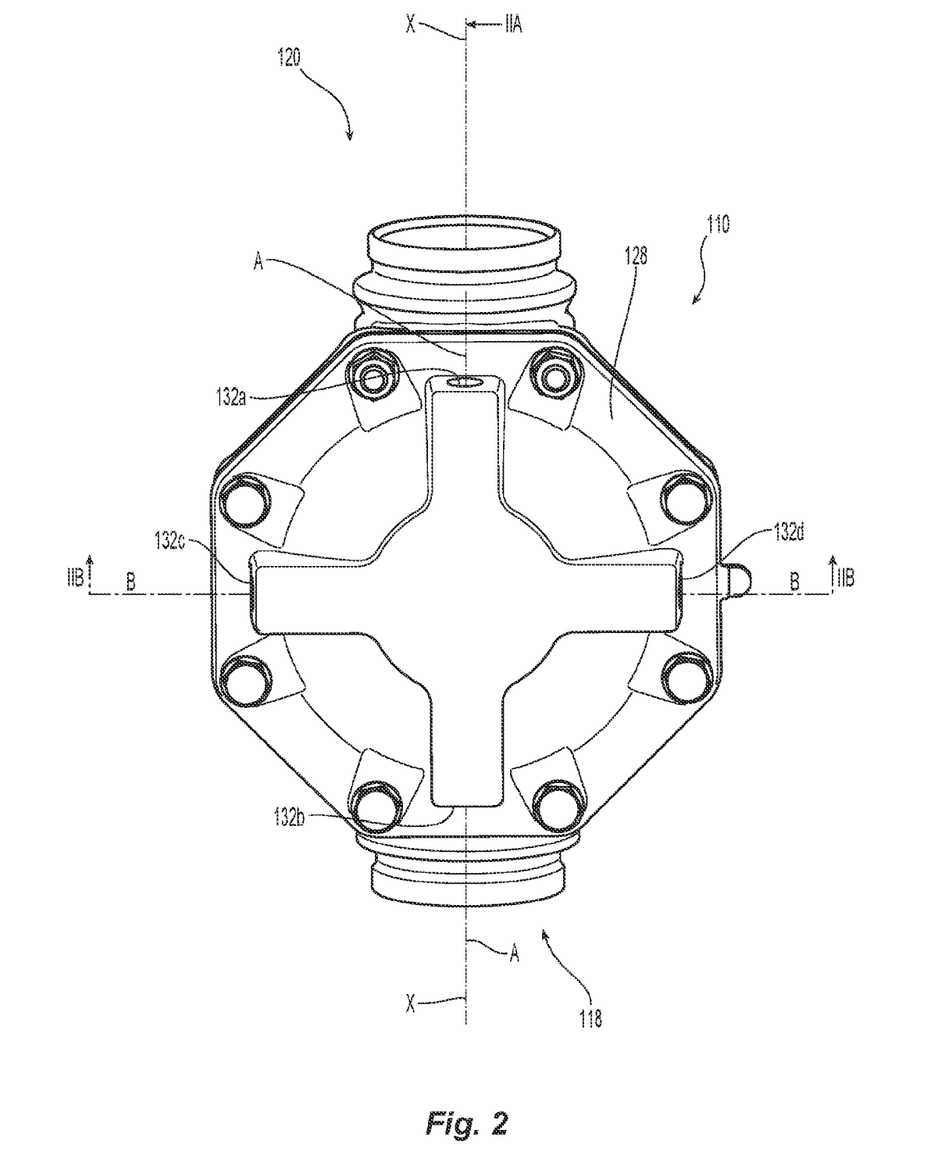
FIG. 2 is a perspective view of a preferred pressure-operated fluid control valve for use in the fluid control valve assembly of FIG. 1.
Figure 2A:
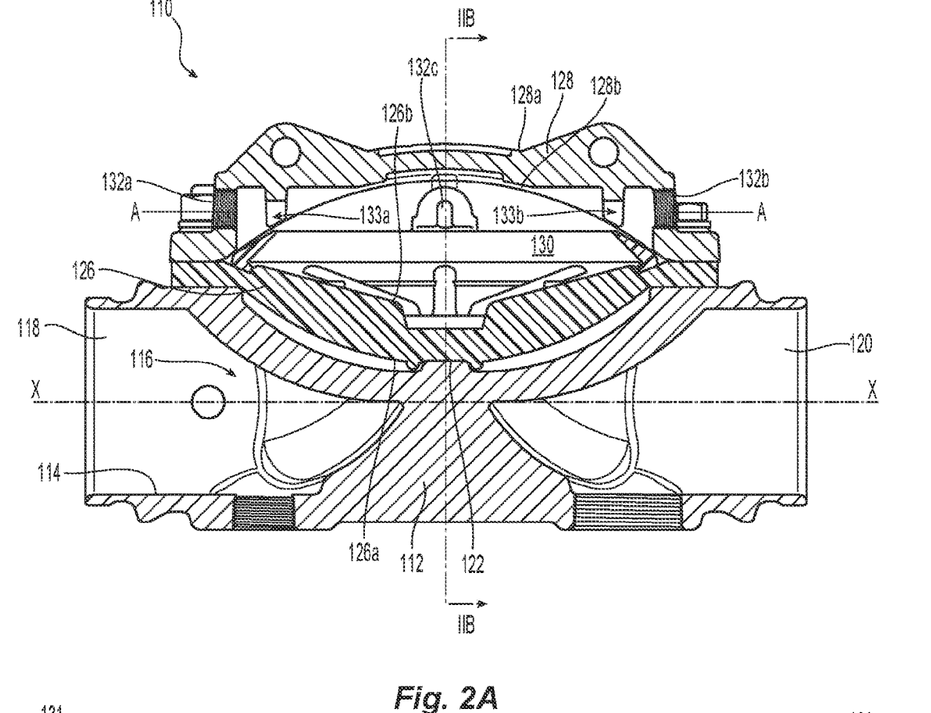
FIG. 2A is a cross-sectional view of the fluid control valve of FIG. 2 along line IIA-IIA.
Figure 2B:
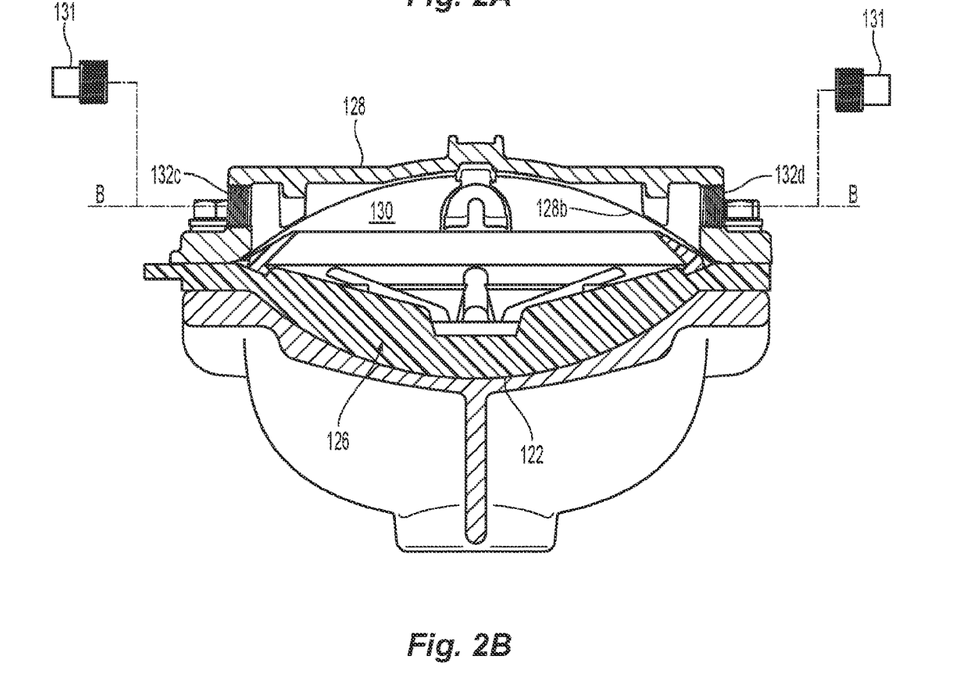
FIG. 2B is another cross-sectional view of the fluid control valve of FIG. 2 along line IIB-IIB.

Preferred embodiments of the valve assembly 100 includes a pressure-operated fluid control valve 110 and an actuator 150 coupled to one another in which the actuator 150 alters an internal pressure of the valve 110 to cause the valve 110 to operate and change from a closed state to an open state permitting the flow of fluid from the fluid supply SUPPLY to the network of fluid distribution devices 20. With reference to FIGS. 2, 2A and 2B, preferred embodiments of the pressure-operated fluid control valve 110 include a valve body 112 with an internal surface 114 that defines an internal passageway 116 that extends along a longitudinal axis X-X with an inlet 118 and an outlet 120 spaced apart from one another along the longitudinal axis X-X. The internal surface 114 of the valve body 112 further defines a valve seat 122 along the passageway 116 between the inlet 118 and the outlet 120. The seat 122 preferably extends transverse to the longitudinal axis X-X.

An elastomeric diaphragm 126 is disposed adjacent the valve body 112. The diaphragm 126 cooperates with the internal surface 114 and the valve seat 122 to define the internal passageway 116 and control the flow of fluid therethrough from the inlet 118 to the outlet 120. The elastomeric diaphragm 126 includes a seal surface 126a and an opposite support surface 126b. The elastomeric diaphragm 126 is mounted to the valve body 112 with the seal surface 126a confronting the internal surface 114 and the valve seat 122 of the valve body 112. In a fluid controlled closed operative state of the pressure operated valve 110, the elastomeric diaphragm 126 defines a closed position in which the seal surface 126a contacts the valve seat 122 in a fluid tight sealed surface engagement to prohibit fluid flow between the inlet 118 and the outlet 120 of the passageway 116. In the fluid controlled open operative state of the valve 100, the diaphragm 126 defines an open position in which the seal surface 126a is displaced from the seat 122 to permit fluid flow between the inlet 118 and the outlet 120 of the passageway 116. In preferred embodiments of the valve 110, the diaphragm is substantially hemispherical with the support surface 126b of the diaphragm being generally concave and the seal surface 126a presenting a generally convex surface for confronting the valve seat 122. Accordingly, as seen in FIG. 2B, the valve seat 122 is preferably arcuate to form a preferred sealed surface engagement with the diaphragms seal surface 126a in a manner as described herein.

The valve 110 further preferably includes a cover 128 disposed on and mounted to the valve body 112 to enclose the elastomeric diaphragm 126. Once mounted, the cover 128 presents an exterior surface 128a and a preferably concave inner surface 128b that confronts the support surface 126b of the elastomeric diaphragm 126 to define a fluid chamber 130 therebetween. In the closed operative state of the valve 110, the fluid chamber 130 is filled to a fluid pressure sufficient to seat the elastomeric diaphragm 126 in its closed position in fluid-tight contact with the valve seat 122. To actuate the valve 110, the fluid pressure is relieved by draining fluid from the chamber 130 to allow the diaphragm 126 to displace to its open position. The cover 128 also preferably provides a plurality of ports 132 that extend from the exterior surface 128a to the inner surface 128b. In the mounted position of the valve cover 128, the plurality of ports 132 include at least one primary port 132a in direct fluid communication with the fluid chamber 130, and at least one secondary port 132b in direct fluid communication with the fluid chamber 130. In preferred embodiments of the pressure operated valve 110, the primary port 132a includes a plurality of primary ports 132a, 132c and the secondary port 132b includes a plurality of secondary ports 132b, 132d.

With reference to FIGS. 2, 2A and 2B, each port 132 provides for a surface entrance 133 along the inner surface 128b to the fluid chamber 130 through which fluid can flow in and out. The ports are spaced apart from one another such that the at least one primary port 132a defines a first surface entrance 133a to the fluid chamber 130 and the at least one secondary port 132b defines a second surface entrance 133b to the fluid chamber with the first entrance 133a being preferably spaced apart from the second entrance 133b. At least one primary port 132a and at least one secondary port 132b are aligned on a common axis. In one preferred embodiment, one primary port 132a and one secondary port 132b are disposed along a common axis A-A which extends generally parallel to the longitudinal axis X-X. Accordingly, in the preferred embodiment of the fluid control assembly 100, the first primary port 132a and the first secondary port 132b are aligned on the first common axis A-A. Alternatively or additionally, one primary port 132c and one secondary port 132d are disposed along an axis B-B that extends generally perpendicular to the longitudinal axis X-X. In such an embodiment, the second primary port 132c and the second secondary port 132d are aligned on the second common axis B-B. In the preferred embodiment shown in FIG. 2 in which there are two primary ports 132a, 132c and two secondary ports 132b, 132d, the first common axis A-A and the second common axis B-B are generally perpendicular to one another.

Each of the preferred ports 132 are sized to facilitate the flow of fluid into and out of the fluid chamber 130. Preferably, each port defines a cross-sectional area perpendicular to the direction of fluid flow with the cross-sectional areas being equivalent or substantially equivalent to one another. More particularly, the cross-sectional areas do not vary from one another by more than 25% and more preferably vary no more than 15%, even preferably varying no more than 7% and yet even more preferably varying no more than 4% from one another. In preferred embodiments of the valve 110, each port 132 has an opening at the exterior surface 128a that is configured for connection to a threaded pipe or threaded fitting of a nominal size which forms the one or more fluid communication lines of the fluid control valve assembly 100 described herein. In preferred embodiments, the threaded pipes or fittings are of a nominal pipe size that ranges from ¼ inch to 2 inches NPT to any nominal size in between and more preferably is any one of ½ inch or 1 NPT. The opening of the port 132 at the exterior surface 128a can be oriented in any manner to facilitate pipe approach and connection to the valve 110. For example, the opening of a port can be oriented so as to intersect or be perpendicular to a common axis of alignment A-A, B-B or alternatively be disposed parallel to the common axis of alignment A-A, B-B.

With reference again to FIG. 1, the preferred valve assembly 100 further includes an actuator 150 coupled to the ports 132 of the valve 110 in a preferred manner for operation of the pressure-operated fluid control valve 110. In the system 10, the valve 110 is maintained in its normally-closed operative state to prevent the flow of firefighting fluid to the network of fluid distribution devices 20. Depending upon one or more system conditions, the actuator 150 will operate to relieve fluid pressure from the fluid chamber 130 to displace the elastomeric diaphragm 126 from its closed position to its open position and place the pressure-operated valve 110 in its open operative state to allow firefighting fluid supplied to the inlet 118 to flow to the outlet 120 and out to the fluid distribution devices 20.

Preferred embodiments of the actuator 150 include an environment-responsive control device 152 in fluid communication with each of at least one primary port 132a and the inlet 118 of the valve 110 via a preferred fluid communication line 155a. More preferably, the environment-responsive control device 152 is directly in communication with the one or more ports such that there is no intervening valving component between the environment-responsive control device and the port. Moreover, the environment-responsive control device 152 is preferably in fluid communication with one or more fluid outlets 154a of the fluid control assembly 100 via the preferred fluid communication line 155a or other fluid communication line to define a preferred first drain line. Accordingly, preferred methods of operating the pressure-operated valve 110 include establishing in response to an environmental condition, fluid communication between the fluid chamber 130 of the valve 110 and one or more fluid outlets 154 to drain fluid from the chamber 130. The operation of the environment-responsive control device 152 causes an initial relief of fluid pressure from the chamber 130 and displacement of the elastomeric diaphragm 126 to initiate fluid flow from the inlet 118 to the outlet 120 of the valve 110.

The actuator 150 also preferably includes a fluid-flow latch 156 in fluid communication with each of at least one secondary port 132b and the outlet 120 of the valve body 110. Preferably, the fluid-flow latch 156 is placed in communication with a secondary port 132b along a preferred second fluid communication line 155b. The latch 156 is also in communication with the outlet 120c preferably by a third communication line 155c to detect the flow of fluid at the outlet 120. Moreover, the fluid-flow latch 156 is preferably in fluid communication with one or more fluid outlets 158a via the preferred second fluid communication line 155b or other fluid communication line to define a preferred second drain line. Preferred methods of operating the pressure-operated valve 110 include, subsequent to the initial fluid flow from the inlet 118 to the outlet 120 of the valve 110, establishing fluid communication between the fluid chamber 130 and a second fluid outlet 158a to drain fluid from the chamber 130. Accordingly, the devices 152, 156 of the actuator 150 provide fluid communication between the fluid chamber 130 and the fluid outlets 154, 158 of the respective preferred fluid communication lines 155a, 155b for preferred simultaneous draining of fluid from the chamber 130. The preferred sequential and continuous operation of the actuation devices 152, 156 provide for the preferably simultaneous fluid flow from the fluid chamber 130 which permits full displacement of the elastomeric diaphragm 126 and maximum fluid flow from the inlet 118 to the outlet 120 of the valve 110.

In preferred embodiments of the pressure operated valve 110 having a plurality of ports 132 in fluid communication with the fluid chamber 130, each of the ports 132 is in fluid communication with one or more of the devices 152, 156 of the actuator 150. In a preferred embodiment, the environment-responsive control device 152 is in fluid communication with each of the plurality of primary ports 132a, 132c and the fluid outlets 154a, 154b, 154c. In a preferred embodiment, the fluid-flow latch 156 is in fluid communication with each of the plurality of secondary ports 132b, 132d and at least one outlet 158a. Alternatively, one or more of the ports 132c, 132d can include an obstruction or plug 131 disposed therein, as schematically illustratively shown in FIG. 2B, to prevent the flow therethrough of fluid from the fluid chamber 130. Thus, in the preferred embodiment of the fluid control assembly 100 shown in FIG. 1 where the first primary port 132a is in fluid communication with the environment-responsive control device 152 and the first secondary port 132b is in fluid communication with the fluid-flow latch 156, each of the first primary port 132c and the second secondary port 132d can have an obstruction disposed therein that prevents fluid flow therethrough. In an alternate embodiment, the second primary port 132c is in fluid communication with the environment-responsive control device 152 and the second secondary port 132d is in fluid communication with the fluid-flow latch 156, each of the first primary port 132a and the first secondary port 132b can have an obstruction disposed therein.

Once one or more of the actuator devices 152, 156 operate in response to a particular system condition, fluid is drained from the fluid chamber 130, preferably sequentially and then simultaneously, through the first and secondary ports 132a, 132b and then discharged out one or more of the fluid outlets 154a, 158a. The pressure in the fluid chamber 130 is relieved which actuates the pressure-operated fluid control valve 110. By preferably draining fluid from the fluid chamber 130 sequentially and then simultaneously through multiple ports, the multiple ports 132 provide a more robust response of the valve 110 to actuating conditions as compared to a valve actuated by fluid drainage through a single port. Each of the environment-responsive control device 152 and the fluid-flow latch 156 of the actuator 150 is a valving device or arrangement to control the release of fluid through a respective fluid outlet 154, 158 of the assembly 100. The environment-responsive control device 152 can be embodied as an automatic fluid release device and/or a manual release device. The fluid flow latch 156 is preferably embodied as an automatic fluid release device. As an automatic release device, each of the environment-responsive control device 152 and the fluid-flow latch 156 preferably operate in response to an electrical control signal, a change thereof and/or a change in fluid pressure or flow. Thus, preferred embodiments of an automatic fluid release device, the environment-responsive control device 152 and the fluid-flow latch 156 can include one or more of a pneumatic actuator, an electric actuator, a pressure-operated actuator, a hydraulic actuator, or a combination of any of a pneumatic, electric, pressure-operated, or hydraulic actuator.

In the system 10, preferred embodiments of the actuator 150 responds to changes in conditions external or internal to the piping of the system 10 and/or the fluid control assembly 100. Depending upon the detected change, the devices of the actuator 150 operate to release fluid from the fluid chamber 130 of the valve 110 to actuate the valve and permit the flow of firefighting fluid to the network of pipes 30. For example, with reference to FIG. 1, the system 10 includes one or more fire detection devices, such as for example a heat detector 122a and/or a smoke detector 122b. In a preferred embodiment of the actuator 150, the environment-responsive control device 152 includes an electronically operated valve 152a and/or a pneumatic operated valve 152b. The electronically operated valve 152a can be embodied by a two-way normally closed solenoid valve. The electronically operated valve 152a is electrically coupled to the fire detection devices 122a, 122b. Upon detection of the presence of smoke, thermal conditions and/or pilot sprinkler actuation indicative of a fire, changes in electrical signals from the fire detection device(s) 122a, 122b cause operation of the electronically operated valve 152a and release of fluid from the fluid chamber 130 of the valve 100 through the primary port 132a, through the first fluid communication line 155a and out the first fluid outlet 154a forming the preferred drain. The release in fluid pressure in the chamber 130 causes the preferred initial displacement of the elastomeric diaphragm 126 to initiate flow of firefighting fluid from the inlet 118 to the outlet 120.

The preferred pneumatic operated valve 152b can be embodied by a pressure operated relief valve 152b. The pneumatic operated valve 152b is preferably coupled to a pneumatic pilot line 153 which maintains a pilot pressure in an unactuated state of the valve 110 with the pilot pressure maintained by one or more thermally responsive release devices 151. In response to a sufficient level or rate of rise in heat, the release devices 151 thermally actuate resulting in the pneumatic pilot line losing pressure. The reduction in pilot pressure actuates the pressure-operated relief valve 152b which releases fluid in the first fluid communication line 155a preferably out the second fluid outlet 154b to form another drain. The release of fluid pressure through the first drain line 155a in the chamber 130 initiates or increases the displacement of the elastomeric diaphragm 126 to permit the initial flow of firefighting fluid from the inlet 118 to the outlet 120.

Also preferably disposed along the first fluid communication line 155a is a manual shut-off valve 152c which is in fluid communication with a third fluid outlet 154c of the first fluid communication line 155a to form another fluid drain. The manual shut-off valve 152c provides a manual actuation device for draining fluid from the fluid chamber 130 for initiating actuation of the pressure-operated valve 110. Additionally, disposed along the fluid communication line 155a is another manual valve arrangement 149 in fluid communication with the fluid chamber 130 and the fluid supply SUPPLY for priming the chamber 130 with fluid pressure to place the diaphragm 126 in its operative closed position. In a preferred aspect, the valve arrangement 149 remains normally open to continuously prime the chamber 130. The valve arrangement 149 also preferably includes a restriction orifice so that upon operation of the actuator 150 fluid drains from the chamber 130 faster than it is being supplied to the chamber to initiate or increase the displacement of the elastomeric diaphragm 126 to permit the initial flow of firefighting fluid from the inlet 118 to the outlet 120.

The fluid-flow latch 156 of the actuator 150 is preferably configured as another pressure-operated relief valve 156 that detects the change in fluid pressure at the outlet 120 of the valve body 112 subsequent to the initial operation of the environment-responsive control device 152. Upon detection of fluid pressure within the second fluid communication line 155b, the preferred pressure-operated fluid flow latch 156 operates to release fluid from the fluid chamber 130 out the second fluid outlet 158a of the second fluid communication line 155b preferably simultaneously with the fluid flow out of the fluid outlets 154 along the first fluid communication line 155a. The simultaneous fluid flow out of the multiple ports 132a, 132b of the valve 110 preferably maximizes the rate reduction in fluid pressure in the fluid chamber 130 and the operation of the valve 110.

The fluid control assembly 100 can provide one or more visual or audible indicators of valve actuation. In one preferred embodiment, the assembly 100 includes an alarm line 160 in which a preferred fluid flow alarm 162 is in fluid communication with the outlet 120 of the valve body 110. To facilitate the flow of fluid from the outlet 120 to the alarm 162 or another fluid drain 158b, a one-way or check valve 164 is preferably disposed between the outlet 120 of the pressure-operated valve 110 and the alarm 162 and the drain 158b. Moreover, a restriction is preferably placed between the drain 158b and the alarm 162 and/or the check valve 164. Alternatively or additionally, the fluid-flow latch 156 can be placed in fluid communication with the alarm line 160.

As schematically seen in FIG. 1, upon actuation of the pressure operated valve 110 firefighting fluid is delivered to the fire protection fluid distribution devices 20 of the system 10 for distributing fluid to wet the surrounding area and address any fire in the area of operation of the sprinkler. The fluid distribution devices 20 can be configured as automatic fire protection sprinklers in which they are normally sealed by a seal assembly held in place by a thermally responsive trigger. In response to an elevated temperature indicative of a fire, the trigger operates to release the seal assembly. Once triggered, fluid delivered to the fluid distribution devices 20 can be distributed by a fluid deflection member to wet the surrounding area and address any fire in the area. In such an arrangement of automatic sprinklers, the fluid distribution devices 20 are interconnected to one another by one or more branch lines 30i in a network of pipes 30. The fluid distribution devices 20 and the pipes 30 are connected to the fluid control assembly 100 by a preferred riser pipe 40. Preferably disposed along the riser 40 between the pressure-operated valve 110 and the network of pipes 30 is a check valve 42. In one embodiment of the sprinkler system 10, the riser 40 and network of pipes 30 are preferably filled with a supervisory pressurized gas of either air or inert gas such as, for example, nitrogen to detect any leaks in the piping. Accordingly, the system 10 preferably includes a pressurized gas subsystem 50 which fills the riser 40 and network of pipes 30 with the pressurized gas. A low pressure alarm (not shown) coupled to the piping 30, 40 can detect the presence of a leak. Alternatively, the riser 40 and network of pipes 30 can be filled with air at atmospheric pressure eliminating the need for the pressurized gas subsystem 50.

In preferred operation of the system 10 in response to a fire, the fire detection devices 122a, 122b detects one or more of smoke, heat, thermal conditions and/or pilot sprinkler actuation indicative of a fire and generates an electrical signal to actuate the environment-responsive control device 152 through, for example, a fire control panel FCP as shown. Fluid drains from the fluid chamber 130 of the valve 110 out of the primary port 132a causing an initial displacement of the elastomeric diaphragm 126 to permit flow of fluid from the inlet 118 to the outlet 120. Fluid flow out of the outlet 120 and the resultant fluid pressure in the second fluid communication line 155b subsequently actuates the fluid-flow latch 156 to simultaneously drain fluid from the fluid chamber 130 out of the secondary port 132b to complete displacement of the diaphragm 126 to its open operative position. Fluid from the valve outlet 120 fills the riser 40 and the network of pipes 30 to the connected fluid distribution devices 20. With fluid delivered to the fluid distribution devices 20, the firefighting fluid is discharged and distributed upon thermal actuation of one or more of the automatic fluid distribution devices 20. Accordingly, the system 10 can be configured as a preaction system.

The gas pressure that fills the system piping 30, 40 in the unactuated state of the system can alternatively or additionally be used to interlock operation of the fluid control assembly 100. Accordingly, the system 10 can be configured as a single or double interlocked preaction system. In such configuration, the pressure within the system piping 30, 40 can be used to preferably maintain the pressure-operated release valve 152b in a closed position in the unactuated state of the fluid control assembly 100. Upon thermal actuation of one or more fluid distribution devices 20, the gas pressure in the piping 30, 40 goes down and the change actuates the pneumatic release valve 152b to drain the fluid chamber 130, preferably subsequently and/or in combination with operation of the environment-responsive control device 152a, to actuate the pressure-operated fluid control valve 110.

The fluid distribution devices 20 of the system 10 can alternatively be configured as normally open devices or sprinklers, i.e., with no sealing assembly, in which firefighting fluid is immediately discharged upon reaching the open device and distributed by a fluid deflection member of the sprinkler to wet the surrounding area and address any fire in the area. In such a configuration, the system piping 30, 40 is at atmospheric pressure in the unactuated state of the system 10. Accordingly, the system 10 preferably does not include the check valve 42 and the pressurized gas subsystem 50. In preferred operation of the system 10 in response to a fire, the fire detection devices 122a, 122b detects a fire and generates an electrical signal to actuate the environment-responsive control device 152a. Fluid drains from the fluid chamber 130 of the valve 110 out of the primary port 132a to initiate displacement of the elastomeric diaphragm 126 and the flow of fluid from the inlet 118 to the outlet 120. Fluid flow out of the outlet 120 subsequently actuates the fluid-flow latch 156 further draining fluid from the fluid chamber 130 to complete displacement of the diaphragm 126 to its open operative position. Fluid from the valve outlet 120 is delivered to the connected open fluid distribution devices 20. Because the fluid distribution devices 20 are open, the delivered water is immediately discharged and distributed over the area being protected upon delivery of the firefighting fluid to the fluid distribution devices 20. Accordingly, the system 10 can be configured as a deluge system.

While the present invention has been disclosed with reference to certain embodiments, numerous modifications, alterations, and changes to the described embodiments are possible without departing from the sphere and scope of the present invention, as defined in the appended claims. Accordingly, it is intended that the present invention not be limited to the described embodiments, but that it has the full scope defined by the language of the following claims, and equivalents thereof.

What is claimed is:

1. An assembly of a pressure-operated fluid control valve and an actuator, comprising:
   a pressure-operated fluid control valve having:
      a valve body including a surface defining a passageway with an inlet and an outlet disposed along a longitudinal axis and a seat transverse to the longitudinal axis,
      an elastomeric diaphragm adjacent the valve body, the elastomeric diaphragm including a seal surface and a support surface, the elastomeric diaphragm defining a closed position in which the seal surface contacts the seat to prohibit fluid flow between the inlet and the outlet of the passageway and an open position in which the seal surface displaces from the seat to permit fluid flow between the inlet and the outlet of the passageway, and
      a cover disposed on the valve body, the cover including an inner surface confronting the support surface of the elastomeric diaphragm to define a fluid chamber, at least one primary port in direct fluid communication with the fluid chamber, and at least one secondary port in direct fluid communication with the fluid chamber; and
   an actuator having:
      an environment-responsive control device in fluid communication with the at least one primary port, the inlet of the passageway, and a first fluid outlet, and
      a fluid-flow latch in fluid communication with the at least one secondary port, the outlet of the passageway, and a second fluid outlet;
   wherein the first fluid outlet in fluid communication with the environment-responsive control device comprises a first drain line, and
   wherein the at least one primary port has a first entrance to the fluid chamber and the at least one secondary port has second entrance to the fluid chamber, the first entrance being spaced apart from the second entrance.

2. The assembly of a pressure-operated fluid control valve and an actuator of claim 1, wherein the second fluid outlet in fluid communication with the fluid-flow latch comprises a second drain line.

3. The assembly of a pressure-operated fluid control valve and an actuator of claim 1, wherein the environment-responsive control device comprises an automatic release device and/or a manual release device.

4. The assembly of a pressure-operated fluid control valve and an actuator of claim 3, wherein the automatic release device comprises at least one of: a pneumatic actuator, an electric actuator, or combination of the pneumatic actuator and the electric actuator.

5. The assembly of a pressure-operated fluid control valve and an actuator of claim 2, wherein the fluid-flow latch comprises a pressure-operated valve in fluid communication with the at least one secondary port, the second fluid outlet, and the outlet of the valve body.

6. The assembly of a pressure-operated fluid control valve and an actuator of claim 1, wherein the at least one primary port and the at least one secondary port are aligned on a common axis.

7. The assembly of a pressure-operated fluid control valve and an actuator of claim 6, wherein the at least one primary port and the at least one secondary port are disposed generally parallel to the longitudinal axis.

8. The assembly of a pressure-operated fluid control valve and an actuator of claim 6, wherein the at least one primary port and the at least one secondary port are disposed generally perpendicular to the longitudinal axis.

9. The assembly of a pressure-operated fluid control valve and an actuator of claim 1, wherein the at least one primary port comprises a plurality of primary ports and the at least one secondary port comprises a plurality of secondary ports.

10. The assembly of a pressure-operated fluid control valve and an actuator of claim 9, wherein the environment-responsive control device is in fluid communication with the plurality of primary ports and the fluid-flow latch is in fluid communication with the plurality of secondary ports.

11. The assembly of a pressure-operated fluid control valve and an actuator of claim 9, wherein the plurality of primary ports comprises a first primary port and a second primary port and the plurality of secondary ports comprises a first secondary port and a second secondary port.

12. The assembly of a pressure-operated fluid control valve and an actuator of claim 11, wherein the environment-responsive control device is in fluid communication with the first primary port and the fluid-flow latch is in fluid communication with the first secondary port, and wherein the second primary port and the second secondary port comprise an obstruction that prevents fluid flow.

13. The assembly of a pressure-operated fluid control valve and an actuator of claim 11, wherein the environment-responsive control device is in fluid communication with the first primary port and the fluid-flow latch is in fluid communication with the second secondary port, and wherein the second primary port and the first secondary port comprise an obstruction that prevents fluid flow.

14. The assembly of a pressure-operated fluid control valve and an actuator of claim 11, wherein the first primary port and the first secondary port are aligned on a first common axis.

15. The assembly of a pressure-operated fluid control valve and an actuator of claim 14, wherein the second primary port and the second secondary port are aligned on a second common axis.

16. The assembly of a pressure-operated fluid control valve and an actuator of claim 15, wherein the first common axis and the second common axis are generally perpendicular.

17. The assembly of a pressure-operated fluid control valve and an actuator of claim 1, further comprising an alarm line in fluid communication with the outlet of the passageway.

18. The assembly of a pressure-operated fluid control valve and an actuator of claim 17, wherein the fluid-flow latch is in fluid communication with the alarm line.

19. The assembly of a pressure-operated fluid control valve and an actuator of claim 1, further comprising a one-way valve in fluid communication with the outlet of the passageway.

20. The assembly of a pressure-operated fluid control valve and an actuator of claim 19, further comprising an alarm line in fluid communication with the outlet of the passageway.

21. The assembly of a pressure-operated fluid control valve and an actuator of claim 20, wherein the fluid-flow latch is in fluid communication with the alarm line.

* * * * *